United States Patent [19]

Benjey et al.

[11] Patent Number: 5,042,300
[45] Date of Patent: Aug. 27, 1991

[54] LIQUID LEVEL SENSOR

[75] Inventors: Robert P. Benjey; Paul C. Weiner, both of Dexter, Mich.

[73] Assignee: Kelsey-Hayes Company, Romulus, Mich.

[21] Appl. No.: 442,472

[22] Filed: Nov. 22, 1989

Related U.S. Application Data

[63] Continuation of Ser. No. 926,040, Nov. 3, 1986, abandoned.

[51] Int. Cl.$^5$ ............ G01F 23/30; G01F 23/76; H01H 9/00
[52] U.S. Cl. .................... 73/308; 73/322.5; 200/84 C; 335/205
[58] Field of Search ............ 73/308, 317, 313, 322.5; 116/229, 228; 200/84 C, 84 R, 61.2, 61.21; 340/623, 625; 335/205

[56] References Cited

U.S. PATENT DOCUMENTS

| | | | |
|---|---|---|---|
| 1,341,002 | 5/1920 | Wright | 73/322.5 |
| 2,792,164 | 5/1957 | Gauffiel | 73/322.5 |
| 2,857,492 | 10/1958 | Kathe | 200/84 C |
| 2,899,517 | 8/1959 | Hastings et al. | 200/84 C |
| 3,022,397 | 2/1962 | Goellner | 200/84 C |
| 3,576,413 | 4/1971 | Creager et al. | 200/84 C |
| 3,852,692 | 12/1974 | Moorman | 335/205 |
| 3,868,845 | 2/1975 | Sykes et al. | 73/322.5 |
| 3,934,103 | 1/1976 | Walstra | 200/84 C |
| 4,211,990 | 7/1980 | Gwozdz | 335/205 |

FOREIGN PATENT DOCUMENTS

| | | | |
|---|---|---|---|
| 1406596 | 6/1965 | France | 73/322.5 |
| 564982 | 10/1944 | United Kingdom | 73/322.5 |

Primary Examiner—William A. Cuchlinski
Assistant Examiner—Daniel G. DePumpo
Attorney, Agent, or Firm—MacMillan, Sobanski & Todd

[57] ABSTRACT

A self-aligning oil level sensing switch is provided with an elongated float shaped to pass freely through a threaded aperture in the side of an engine crankcase as a switch housing is screwed into the aperture. The float is free to rotate about one end of a mounting rod, and is unsymmetrical about its center of mass such that it is automatically aligned by gravity into its intended operating position, regardless of the final rotative position of the switch housing. The mounting rod is pivotally and rotatably mounted on the switch housing and has an opposite end provided with a counterweight which is unsymmetrical and is free to rotate with the rod. A magnetically actuated switch mechanism includes a spring-biased magnet enclosed in a conductive sleeve which is electrically coupled to a first connector pin. The sleeve is positioned within an electrically-conductive, magnetically-transparent cover member electrically coupled to a second connector pin. The cover member seals and isolates the switch from the oil. When the engine oil level is at or above a predetermined level, the float causes the mounting rod to pivot to a position wherein the end of mounting rod is positioned proximate the cover member. The mounting rod is constructed of a ferromagnetic material and causes the conductive sleeve to be drawn against and make electrical contact with the cover member to close a switch circuit. When the engine oil level falls below the predetermined level, the end of the mounting rod is pivoted out of the field of the magnet, and the conductive sleeve is spring biased away from the cover member to open the circuit.

21 Claims, 4 Drawing Sheets

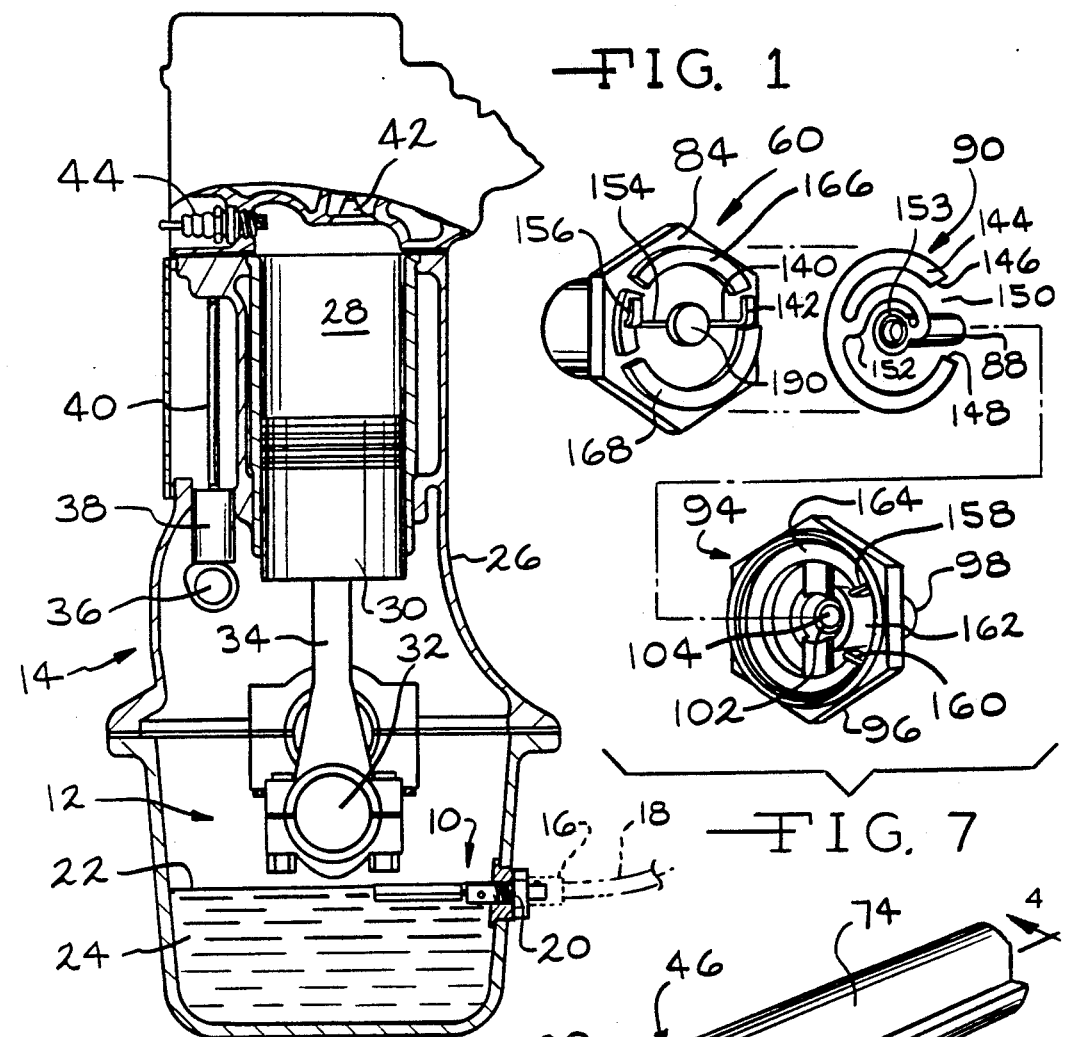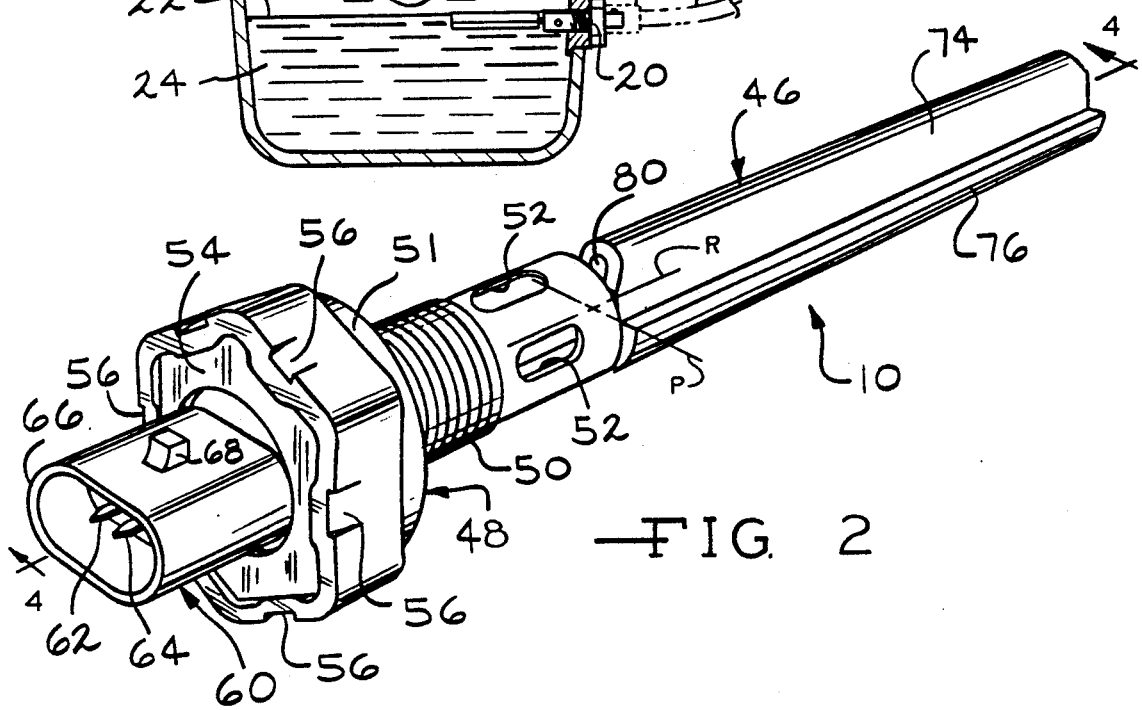

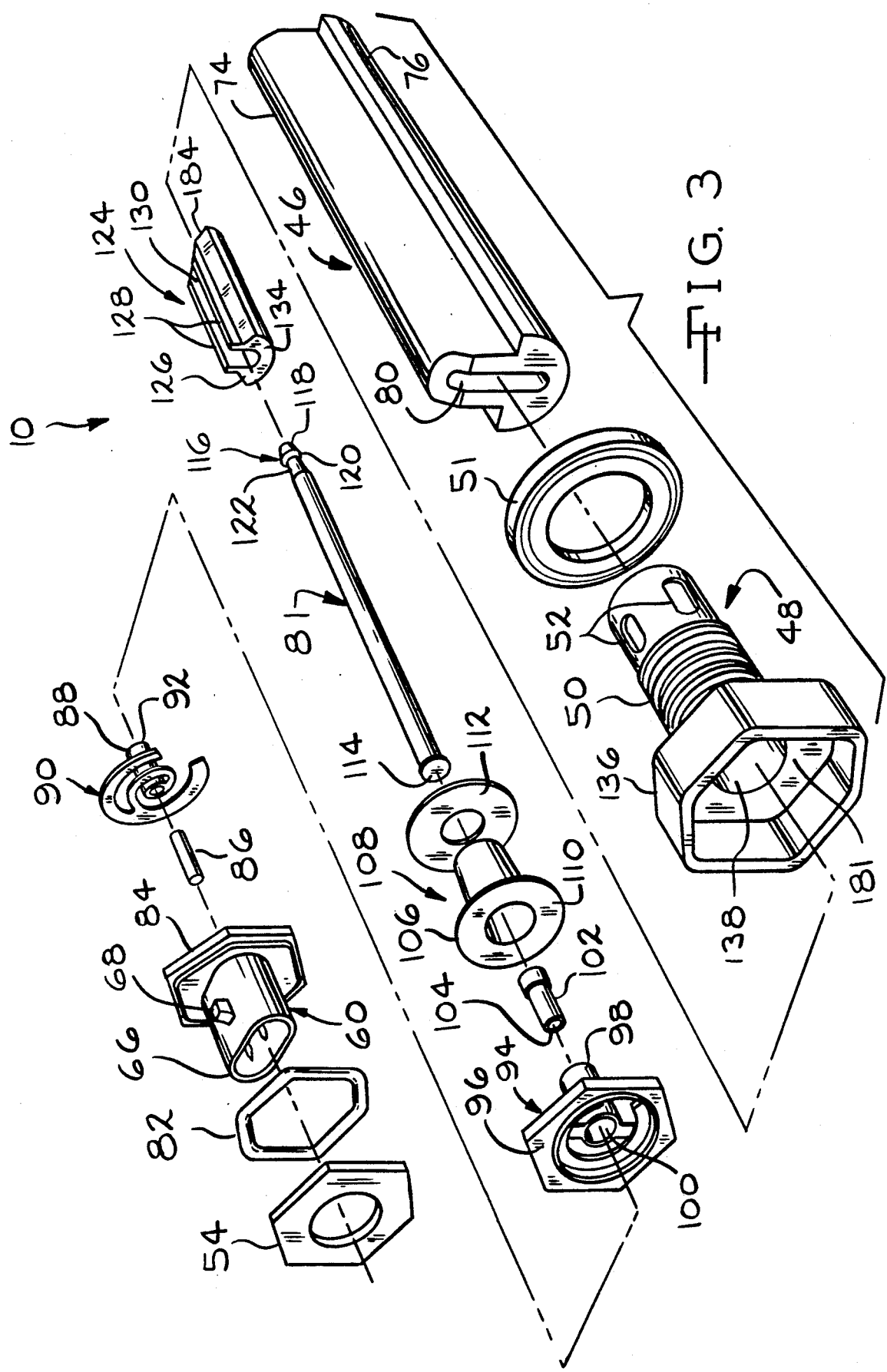

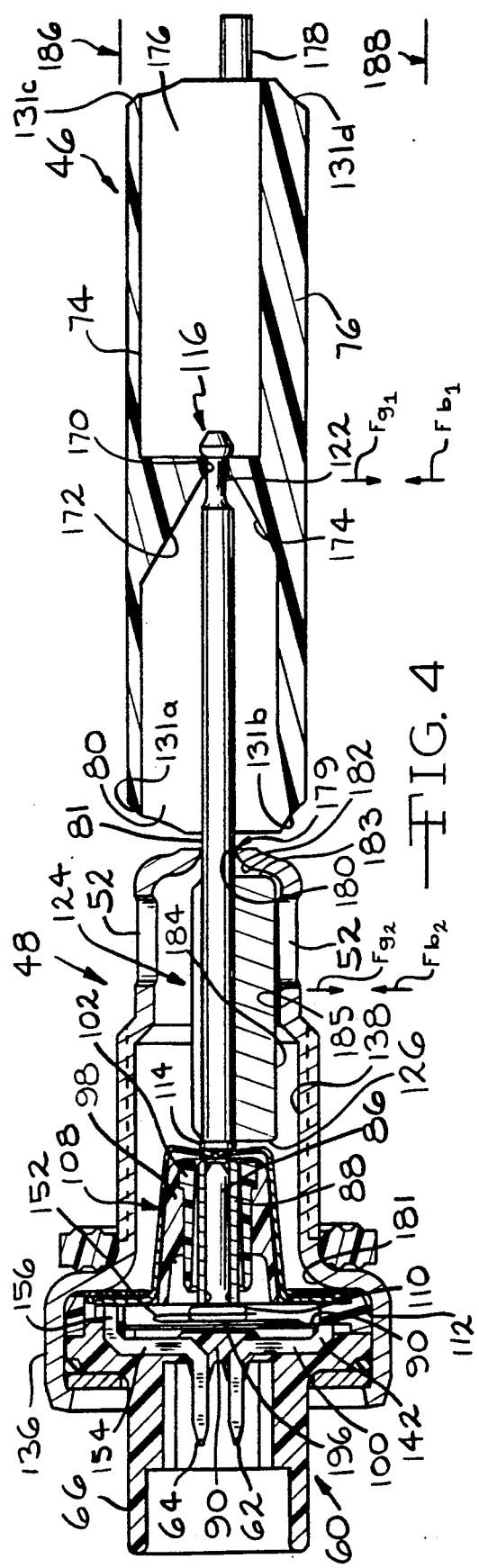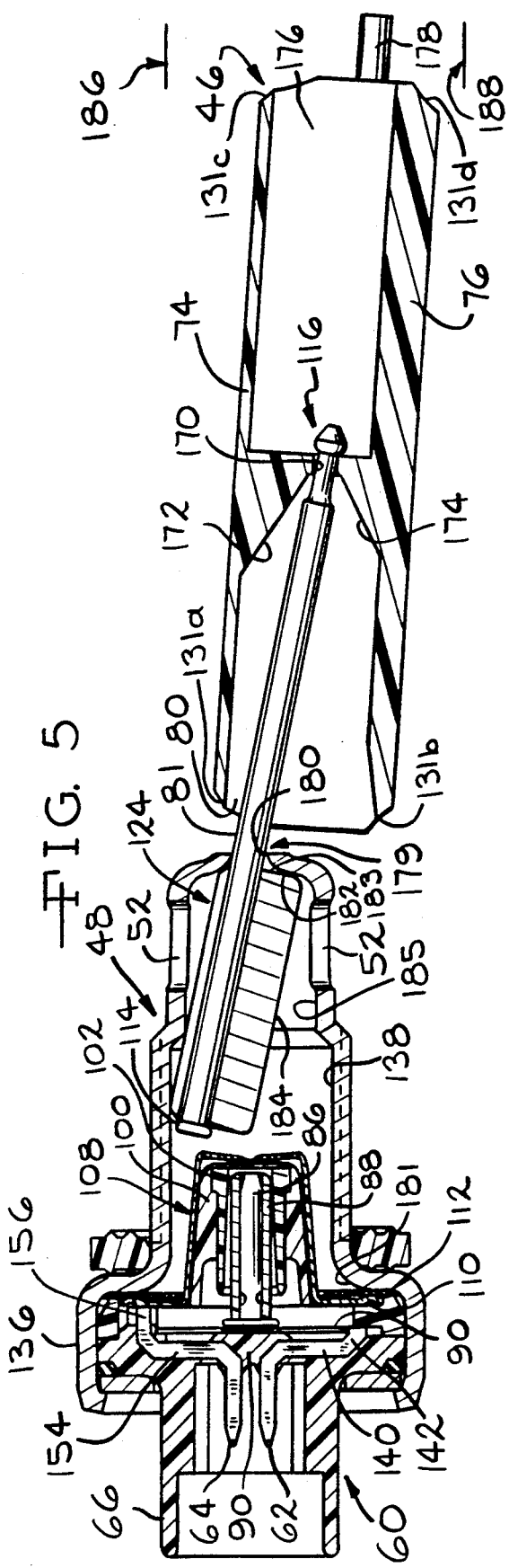

LIQUID LEVEL SENSOR

This is a continuation of Ser. No. 026,040 filed Nov. 3, 1986, now abandoned.

BACKGROUND OF THE INVENTION

This invention relates generally to a liquid level sensor and, in particular, to an engine oil level sensor which is automatically aligned in proper operating position by the force of gravity.

Over the past decade, there has been an ongoing endeavor by the industry to reduce the maintenance associated with automobiles. For example, some engines now include electronic ignition systems and computer controlled fuel injection systems which do not require any regular 15 maintenance or adjustments. Due to these recent improvements, there has been a tendency for vehicle owners to forget about certain critical engine maintenance functions which still must be performed, such as changing of the engine oil and engine coolant, and maintaining the engine oil and coolant at the proper levels between fluid changes. Moreover, due to the recent increase in number of self service gas stations and the reduced number of full service gas stations, engine oil and coolant levels are not checked by the vehicle operators on a regular basis. Accordingly, automotive manufacturers have found it desirable to incorporate fluid level sensors in order to provide an indication to the vehicle operator when the level of a particular fluid is low.

The prior art has proposed numerous types of liquid level sensors for sensing levels of various types of liquids For instance, U.S. Pat. No. 2,116,425 discloses a float switch for a refrigerant casing. The switch carries a horseshoe magnet on a pivotally mounted float to contact a pair of low-reluctance plugs at extremes of its motion. The plugs in turn attract one end or the other of a pendulum-shaped switch element, causing operation of electrical contacts.

U.S. Pat. No. 2,577,165 discloses a float switch for a pressure chamber such as a boiler. The switch uses a pair of permanent magnets to transmit the mechanical movement of a pivotally mounted float through a non-magnetic wall of a pressure chamber to operate a mercury switch.

U.S. Pat. No. 2,885,507 discloses a level indicating switch in which a conventional mechanically actuated switch is disposed in a flexible bag. The switch is operated by pressure applied against the bag by linkage connected to a pivotally mounted float which is responsive to the level of oil in an automobile automatic transmission.

More recently, liquid level sensors have incorporated magnetically-actuated reed switches. For example, U.S. Pat. No. 4,441,860 discloses a fluid level sensor using a reed switch and a two-part lost motion float, one part of the float either carrying a magnet to actuate the reed switch or carrying a soft iron member to complete a magnetic circuit to actuate the reed switch. The float is maintained in either of two vertical positions by the cooperation of magnets and soft iron to provide hysteresis in its operation.

However, the prior art devices typically require some form of careful alignment, so that the forces of buoyancy and gravity act in colinear opposition. The present invention overcomes this and other disadvantages of the prior art, as will be apparent from the description which follows.

SUMMARY OF THE INVENTION

The present invention relates to a liquid level sensor which incorporates a magnetically actuated switch means and includes a unique float means which is automatically aligned in proper operating position by the force of gravity. The preferred embodiment of the invention is specifically designed for use as an engine oil level sensor and is adapted to be inserted through and secured to an internally threaded aperture provided in the sidewall of an engine crankcase.

More specifically, the sensor of the present invention includes a housing means having one end adapted to extend into the engine crankcase. A magnetically actuated switch means is positioned inside the housing means. Means are provided for sealing the switch means from the oil in the crankcase. The switch means has a first circuit condition indicating a satisfactory oil level in the crankcase and a second circuit condition indicating an unsatisfactory oil level. A float means is provided with switch actuation means moveable toward and away from the switch means. The float means is pivotally and rotatably supported by the housing means and is moveable between a first position wherein the switch actuation means is adjacent said switch means and a second position wherein the switch actuation means is spaced from the switch means. The switch means is actuated to the first circuit condition when the float means is in the first position and is actuated to the second circuit condition when the float means is in the second position.

In the preferred embodiment of the invention, the float means includes a rod supported by the housing means for both pivotal and rotational movement. The float means further includes an elongate float member which is unsymmetrical about its longitudinal axis and is rotatably mounted about one end of the rod. The opposite end of the rod is formed of a ferrous material.

Further, the switch means is provided with a first contact means and a magnet which carries a second contact means. The magnet is moveable between a first position wherein the first and second contact means are spaced from one another to open the circuit, and a second position wherein the first and second contact means contact one another to close the circuit. Normally, the magnet is biased to the first position to open the contacts. However, when the fluid is at or above a predetermined level, the float means is operable to pivot the rod and position the ferrous end of the rod adjacent the magnet, causing the magnet to be attracted to the rod and moving the magnet from the first position to the second position to close the switch circuit.

The sensor of the present invention is specifically designed with a construction which enables the sensor, as an assembly, to be inserted through and threadedly secured within the internally threaded aperture provided in the crankcase sidewall. Moreover, the unsymmetrical design of the float causes the float to be automatically oriented in its proper operating position, regardless of the rotative position of the housing. Further, since the switching contacts are effectively sealed from the oil within the crankcase, long operation of the switch is insured.

BRIEF DESCRIPTION OF THE DRAWINGS

The above, as well as other advantages and features of the present invention, will become readily apparent to one skilled in the art from reading the following detailed description of the preferred embodiment of the invention in conjunction with the attached drawings, in which:

FIG. 1 shows a liquid level sensor according to the invention disposed in the crankcase of a conventional engine which is shown in partial cross-section;

FIG. 2 is a perspective view of the liquid level sensor of FIG. 1;

FIG. 3 is an exploded perspective view illustrating the individual components of the liquid level sensor of FIG. 2;

FIG. 4 is a sectional view of the sensor taken along the line 4—4 of FIG. 2 and showing the float in an upper position to close the switch circuit;

FIG. 5 is a sectional view, similar to FIG. 4, but showing the float of FIG. 2 pivoted to a lower position to open the switch circuit;

FIG. 7 is an exploded perspective view showing a portion of the components of the switching unit included in the sensor of the present invention.

DETAILED DESCRIPTION OF THE PREFERRED EMBODIMENT

Figures 6, 6A:
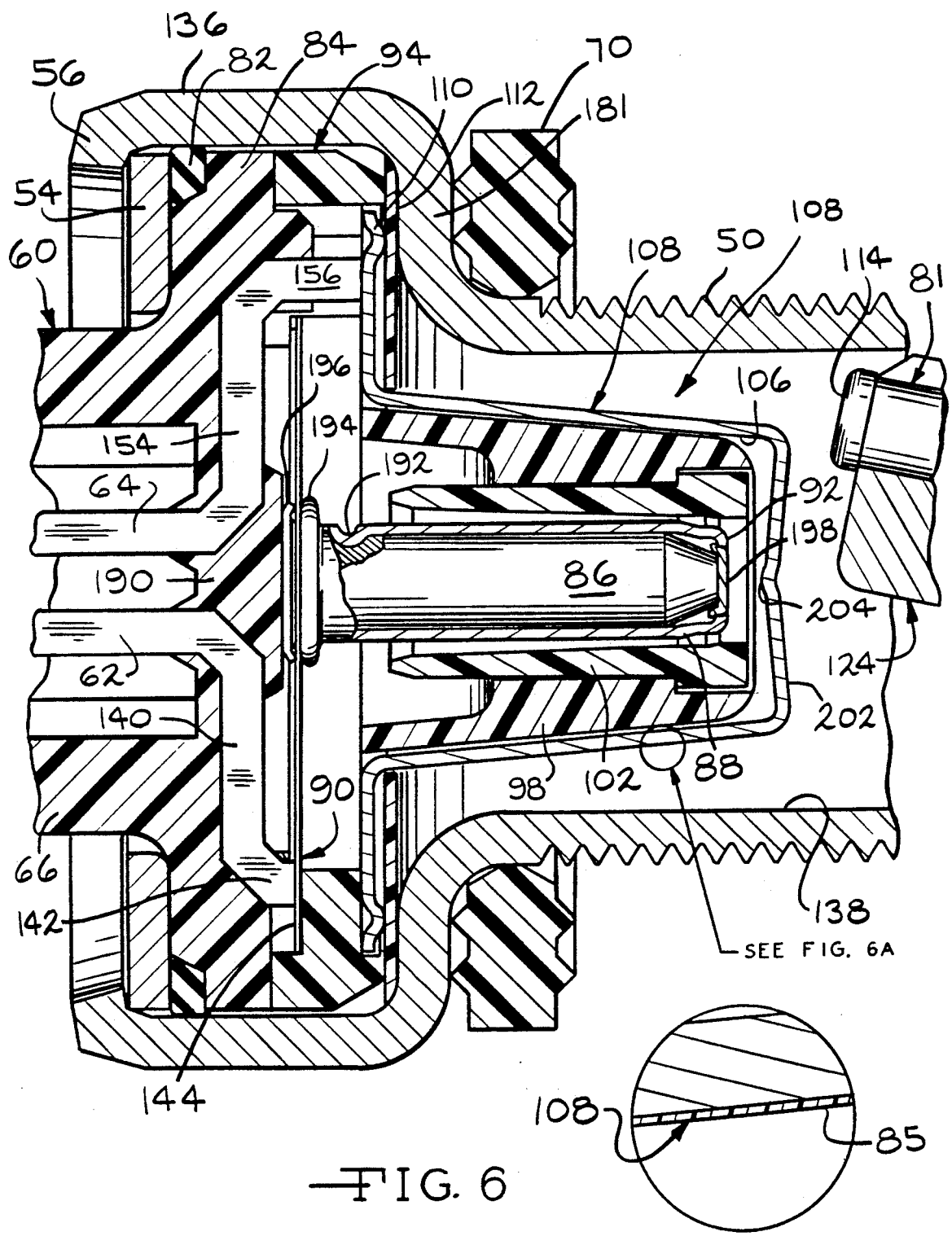
FIG. 6 is an enlarged view of the switching unit of the sensor shown in FIG. 5.
FIG. 6a is an enlarged fragmentary section view through a portion of the cover shown in FIG. 6.

Referring to FIG. 1, there is shown a liquid level sensor 10, according to the present invention, which is positioned to sense the oil level within a crankcase reservoir 12 of an engine 14. The sensor 10 is connected to connector 16 and an interconnecting cable 18. The liquid level sensor 10 is retained in a threaded aperture 20 provided in the sidewall of the engine 14. In FIG. 1, the sensor 10 is shown in the actuated position caused by a full or satisfactory level 22 of engine oil 24. The engine 14 is conventional, and intended only as an example of one type of mounting arrangement which can be used with the liquid level sensor 10. As shown in FIG. 1, the engine 14 includes an engine block 26 having a plurality of cylinders 28. The cylinders are provided with pistons 30 which are coupled to a crankshaft 32 by means of connecting rods 34. A camshaft 36 actuates lifters 38 which, through push rods 40, are coupled to operate valves 42. The fuel-air charge introduced into the cylinders 28 is ignited by spark plugs 44.

Referring now to FIG. 2, there is shown a perspective view of the liquid level sensor 10. The sensor 10 includes a float 46 which, as will be discussed, is pivotally and rotatably mounted relative to a housing 48 about pivot axis P and rotational axis R. As illustrated, the housing 48 includes an externally threaded portion 50 for engaging the threaded aperture 20 provided in the sidewall of the engine.

A sealing washer 51 is shown disposed adjacent the threaded portion 50, and is adapted to form a leak proof seal between the liquid level sensor 10 and the crankcase oil reservoir 12. The one end of the housing 48 is generally cylindrical and includes a plurality of circumferentially spaced oil-drain apertures 52 which are shape. The oil-drain apertures 52 are provided to allow normal movement of the oil to flush out any solid particles which may accumulate and interfere with the mechanical movement of the float 46. The opposite end of the housing 48 is hexagonally shaped and is crimped over a retaining washer 54 at crimped locations 56. An electrical connector 60 extends axially through and protrudes from the washer 54. The connector 60 includes a pair of contact pins 62 and 64, a surrounding connector shell 66, and a locking tab 68 extending upwardly from an outer surface of the shell 66 for retaining the connector 16 shown in FIG. 1.

The float 46 is generally elongated and has a cross-sectional shape and size which enables it to pass freely through the crankcase aperture 20. Also, in accordance with a present invention, the cross-section of the float 46 is unsymmetrical in mass distribution, allowing it to be properly oriented to a selected position by the force of gravity after the housing 48 has been threaded into the aperture 20. As illustrated in FIG. 3, the float 46 has a pendulum-like cross-sectional profile, with a top portion 74 and a bottom portion 76. The top and bottom portions 74 and 76 are generally U-shaped in cross-section, with the top portion 74 inverted and coupled to the bottom portion 76 to define a longitudinally extending slot 80 in one end of the float 46. As will be discussed, the float 46 is coupled to the housing 48 by a pivot rod 81 (shown in FIG. 3) having an outer end which extends into the slot 80. The bottom portion 76 has thicker walls than the top portion 74 such that the center of gravity of the float is spaced from its longitudinal axis. This causes the bottom portion 76 to function as a weight for aligning the float 46 in the proper operating position with the slot 80 in a generally vertical orientation as shown in the drawings.

FIG. 3 illustrates an exploded perspective view of the main components of the liquid level sensor 10. As illustrated, the retaining washer 54 is formed with a hexagonal outer periphery, and retains a hexagonal 0-ring 82 against a flanged portion 84 of the connector 60 which also has a hexagonal outer periphery. A cylindrical magnet 86 is adapted to be received in a contact sleeve 88 having one end attached to a cantilever spring 90. The contact sleeve 88 can be attached to the cantilever spring 90 by a crimping operation, such that crimped end of the sleeve functions to retain the magnet 86 within the contact sleeve 88. Also, the contact sleeve 88 is preferably provided with a separate contact member at its opposite end 92. The contact sleeve 88 is provided to avoid the necessity of passing an electrical current through the magnet 86 which may tend to demagnetize it. However, if a magnet material of sufficient permanence is used, the contact sleeve 08 may not be required.

The assembly consisting of the spring 90 and the contact sleeve 88 is maintained in position within the housing 48 by a retainer 94. The retainer 94, which is typically constructed of a plastic material, includes a flange 96 with a hexagonal outer periphery, and a tubular portion 98 which extends axially from the flange 96 and defines a central aperture 100. The central aperture 100 receives a tubular guide member 102 having a bore 104 for receiving and axially guiding the contact sleeve 88. The guide member 102 is typically made of a material which has greater wear resistance than the material of the retainer 94. Thus, if desired, the retainer 94 could be made of such material and the guide member 102 would not be necessary.

The guide member 102 is received in an aperture 106 of a hat-shaped cover 108 provided with a flange 110 at its open end. The cover 108 is made of an electrically conductive, magnetically transparent material such as aluminum or stainless steel, or a metallic-filled plastic material or the like. A sealing washer 112 is adapted to slip over the end of the cover 108.

The pivot rod 81 which is utilized to couple the float 46 to the housing 48 is provided with an enlarged end 114, and an opposite latching end 116. The latching end 116 is defined by a conical point 118 with a shoulder 120 connected to a neck portion 122 of lesser diameter than that of the rest of the rod 81. At least the enlarged end 114 of the pivot rod 81 is made of a ferrous material. Preferably the rod 81 is made entirely of steel, and is plated with zinc.

A counterweight 124, formed of a corrosion-resistant material, is preferably a press fit on the rod 81 with one end surface 126 of the counterweight 121 positioned adjacent the enlarged end 114 (as shown in FIG. 4). The counterweight 124 is fabricated of stainless steel, although other materials are of course useable, and it can be retained on the rod 81 by crimping or any other suitable means. Like the float 46, the counterweight 124 also has an unsymmetrical mass distribution. The counterweight 124 includes a top portion being defined by upstanding parallel walls 128 defining a groove 130 which extends longitudinally and receives the rod 81. A bottom portion of the counterweight is enlarged and defines a thickened bottom wall 134 of the groove 130.

Other methods can be used to attach the counterweight 124 to the rod 81. For example, in one preferred embodiment of the invention, the right hand half of the rod is provided with a reduced diameter portion (not shown) relative to the area adjacent the enlarged end 114 where the counterweight 124 is to be attached. This enables the counterweight 124 to be formed with a longitudinally extending central bore hole instead of the groove 130, with the bore hole sized such that the counterweight can be slipped over the reduced diameter portion of the rod 81, and can frictionally engage the rod in the area adjacent the end 114.

During assembly, the cover 108 receives the tubular portion 98 of the retainer 94 having the guide member 102 inserted therein, and the spring 90 with the contact sleeve 88 and the magnet 86 is received by the retainer 94. The O-ring 82 and the retaining washer 54 are placed on the shell 66 of the connector 60. The connector 60, the retainer 94, and the cover 108, along with the associated elements, are inserted into a cup-shaped hexagonal end portion 136 of the housing 48 having a bore 138 formed in the threaded portion 50. The assembly can then be retained within the housing 48 by the crimping of the end portion 136 (at locations 56 as shown in FIG. 2). The end portion 136 is preferably in the shape of a conventional nut, so that a conventional wrench can be used to rotationally engage the threaded portion 50 with the threaded aperture 20.

Referring now to FIGS. 6 and 7, the electrical contact path of the sensor 10 between the connector pins 62 and 64 will now be discussed in more detail. As shown in FIG. 6, the connector 60 is molded around the contact pins 62 and 64 which are typically formed from strip stock. The pin 62 has a pointed end (shown in FIG. 2) extending axially toward the open end of the connector 60. A central portion 140 of the pin 62 extends radially and the pin 62 terminates in a contacting end portion 142 bent at right angle to the plane of the central portion 140. The cantilever spring 90 has a semi-circular ring 144 with ends 146 and 148 defining a gap 150. A semi-circular spring arm 152 extends between a central point on the ring 144 and the center of the ring 144 where the arm 152 terminates to define an aperture 153. The contact sleeve 88 has one end connected to the spring 90 at the aperture 153 in the spring arm 152. The end portion 142 of the pin 62 contacts the ring 144 and establishes an electrical connection between the contact pin 62 and the contact sleeve 88 through the curved spring arm 152.

In like fashion, the contact pin 64 includes a pointed end, a central portion 154 extending radially, and a contacting end portion 156 bent at a right angle to the portion 154. The end 156 extends through the gap 150 in the conducting ring 144 and establishes electrical connection with the flange 110 of the cover 108. The retainer 94 has radially extending ribs 158 and 160 (shown in FIG. 7) which cooperate with the ends 146 and 148 of the conducting ring 144 to position the cantilever spring 90 and align the gap 150 with a gap 162 between the ribs 158 and 160 for allowing the contact pin end 156 to pass through and contact the flange 110. The retainer 94 also includes a semi-circular surface 164 formed between the ribs 158 and 160 for supporting the conducting ring 144. Also, the connector 60 includes a pair of semi-circular projections 166 and 168 which bear against the ring 144 to retain it in place.

Turning now to FIGS. 4 and 5, it may be seen from the sectional view of the float 46 that the right half portion of the pivot rod 81 is disposed in the slot 80 and the latching end 116 is guided into place in an aperture 170 defined by inwardly tapered wall portions 172 and 174 forming an interior end of the slot 80. The aperture 170 is formed of a diameter slightly larger than the diameter of the pivot rod neck portion 122, to enable the float 46 to freely rotate about the pivot rod. A slot 176 is provided in the other end of the float 46 to control the weight of float 46. Since the slot 176 is visually similar to the slot 80, incorrect assembly is a possibility. Thus, an externally projecting pin member 178 is provided adjacent the open end of the slot 176 for a visual indication of orientation, and also to prevent incorrect assembly by interfering with the housing 48. In the preferred embodiment of the invention, the float 46 is made of nylon and is initially heated to approximately 93.3° C. (200° F.) to soften it, and then the pivot pin latching end 116 is pushed through the aperture 170 to snap it in place.

It should be noted that, since nylon is a material which is more dense than oil, an upward force $Fb_1$ (shown in FIG. 4) due to buoyancy of the float 46 in oil is less than a downward force $Fg_1$ due to gravity. In like fashion, since the counterweight 124 is typically made of corrosion resistant metal, a downward force $Fg_2$ of gravity acting on the coutnerweight 124 exceeds an upward force $Fb_2$ due to buoyancy. Thus, it will be apparent that the relative buoyant forces, and the relative weights and lever arms of the float 46 and the counterweight 124, must be controlled so that removal of the buoyant forces $Fb_1$ and $Fb_2$ from both the float 46 and the counterweight 124 by a decrease in the liquid level causes the float 46 to drop downwardly as shown in FIG. 5 and open the switch contacts. Further, the reapplication of the buoyant forces by restoration of the correct fluid level causes the rod 81, the float 46, and the counterweight 124 to assume a horizontally aligned position as shown in FIG. 4 wherein the switch contacts are closed.

It may also be seen in FIGS. 4 and 5 that the float 46 is provided with beveled edges on both ends to facilitate the insertion and removal of the sensor 10 from a mounting aperture such as the aperture 20 shown in FIG. 1. These beveled portions are identified in FIGS. 4 and 5 as beveled portions 131a, 131b, 131c, and 131d.

Prior to attaching the float 46 to the pivot pin latching end 116, the counterweight 124 is pressed onto the pivot rod 81, and the assembly is inserted into the housing 48 such that the pivot rod 81 extends through a pivot aperture 179 provided in the end of the housing 48. The pivot aperture 179 is formed to define a pivot edge 180 upon which the rod 81 pivots, and is formed a diameter slightly larger than the rod 81 to enable the rod to freely rotate. The sealing and insulating washer 112, shown best in FIG. 6, is interposed between the flange 110 of the conductive cover 108 and a shoulder portion 181 of the housing 48. The cover 108, the washer 112 and the shoulder 181 cooperate to seal the switch elements and isolate them from oil which will enter the housing bore 138. It will be appreciated that several methods of assembly are of course possible since the order of assembly is a matter of manufacturing convenience.

FIG. 4 shows the sensor in the actuated position when the level of liquid being measured, such as engine oil, is at a full level 186, which is similar to the oil level 22 shown in FIG. 1. FIG. 5 shows the unactuated position of the sensor when the liquid is at a lower level 188.

It will also be appreciated, from inspection of the drawings, and particularly FIGS. 4 and 5, that the rod 81, the float 46, and the counterweight 124 will move slightly axially toward the left while pivoting from the position shown in FIG. 5 to the position shown in FIG. 4. The inner wall of the housing defines a camming surface 182 located below the aperture 179 which cooperates with an end face 183 of the counterweight 121. As the float 46 is pivoted upwardly, the end face 183 is cammed by the surface 132 to urge the entire float assembly slightly toward the left as viewed in the drawings. This is advantageous since normal movement of the liquid being measured may cause small vertical movements of the float 46 and the resulting small axial horizontal movements of the rod 81 tend to keep the pivot aperture 179 and the gap between the enlarged rod end 114 and the closed cover end 202 free of dirt and contamination.

Also, as illustrated, a lower bottom surface 184 counterweight 124 cooperates with an interior bottom surface 185 of the housing 48 to act as a stop means for the float 46, preventing any further upward pivotal movement of the float from the position shown in FIG. 4.

Referring now to FIGS. 4, 5, and 6, it can be seen that when fluid being sensed is at the level 188, the end 114 of the rod 81 is removed from the field of the magnet 86, so that the spring 90 biases and urges the contact sleeve 88 against a stop button 190 (also shown in FIG. 7) formed on the connector shell 66 between the pin portions 140 and 154. As can be best seen in FIG. 6, the magnet 86 is retained within the contact sleeve 88 by an inwardly extending dimple 192 formed in the left most end of the sleeve 88. As previously mentioned, the contact sleeve 88 is fastened to the spring 90 at the aperture 153 (best shown in FIG. 7) formed in the end of the spring arm 152. A rolled flange 194 is formed on the sleeve 88 adjacent the dimple 192 and a flange 196 is formed on the outermost end of the sleeve such that the spring arm 152 is trapped between the flanges 194 and 196.

As shown in FIG. 6, the end 92 of the contact sleeve 88 is closed by a contact button 198 formed of a durable contact material, such as silver or silver plated metal, and pressed into place in an aperture formed at the end 92 of the contact sleeve 88. Also, a closed end 202 of the cover 108 tapers inwardly to for a central contact area 204 inside the aperture 106. The contact area 204 is preferably coated by silver plating or formed by welding or otherwise fastening a piece of contact material at the contact area 204.

As will be apparent from FIG. 6, when the end 114 is pivoted upward, the end 114 is sufficiently spaced from the magnet 86 such that the spring force on the magnet overcomes any axial magnetic attraction between the end 114 and the magnet. Thus, the button 198 is spaced from the contact area 204 to open the switch circuit. However, if the end 114 of the rod 81 is moved adjacent to the contact area 204, as shown in FIG. 4, the magnet 86 will be drawn towards the end 114, moving the contact sleeve 88 and the button 198 into contact with the contact area 204. This movement completes an electrical circuit from the connector pin 64, to the cover 108, to the contact sleeve 88, through the spring 90, and to the contact pin 62. In FIG. 4, the curved spring arm 152 is visible with the magnet 86 being attracted towards the end 114 and the flange 196 being spaced away from the stop button 190.

When the end 114 of rod 81 is moved adjacent to cover 108 and in alignment with magnet 86, end 114 may contact the outside surface of cover 108 as shown in FIG. 4. Therefore cover 108 is coated with a non-electrical conducting, magnetically transparent material 85, such as any suitable plastic, to prevent short circuitry of the electrical circuit described above.

The present invention, although intended for use in measuring engine oil level, can be easily modified to indicate the level of other types of liquid, by appropriate modification of the materials and structure of the float. For example, a hollow float can be used, with a corresponding change in size or weight of the counterweight.

In accordance with the provision of the patent statutes, the present invention has been illustrated and described in what is considered to represent its preferred embodiment. However, it should be noted that the invention can be practiced in a manner other than as specifically illustrated and described without departing from the scope of the attached claims.

What is claimed is:

1. An apparatus for sensing the level of fluid in a container comprising:

housing means having one end adapted to extend into a container for fluids through an aperture formed in a wall of the container;

switch means positioned inside said housing means and having a first circuit condition indicating a satisfactory fluid level in the container and a second circuit condition indicating an unsatisfactory fluid level in the condition;

means for sealing said switch means from the fluid in the container; and float means including an elongated rod having a float member supported at one end thereof, a switch actuation means located at an opposite end thereof, and an intermediate portion located between said float member and said switch actuation means;

said float member constructed and arranged to float in fluid in the container and mounted on said rod for free rotation relative to said rod about the longitudinal axis of said rod;

said intermediate portion being supported by said housing means to enable pivotal movement of said rod with said float member attached thereto about a pivot axis generally intersecting the longitudinal axis of said rod, said rod being pivotal between a first position wherein said switch means is actuated to said first circuit condition and a second position wherein said switch means is actuated to said second circuit condition.

2. The apparatus according to claim 1 including means for axially moving said rod with said float means attached thereto along a rotational axis as said rod is pivoted about said pivot axis, said rotational axis intersecting said pivot axis.

3. The apparatus according to claim 1 wherein said housing means is externally threaded for engaging a threaded aperture in a container.

4. The apparatus according to claim 1 wherein said float means is operable to position said switch actuation means adjacent said switch means when said rod is in said first position and to position said switch actuation means spaced from said switch means when said rod is in said second position.

5. The apparatus according to claim 4 wherein said switch means includes magnet means moveable between first and second positions, biasing means biasing said magnet means to said magnet means first position to actuate said switch means to said second circuit condition, and contact means responsive to said magnet means in said magnet means second position to actuate said switch means to said first circuit condition.

6. The apparatus according to claim 5 wherein said magnet means is moved to said magnet means second position by magnetic attraction to said switch actuation means when said switch actuation means is adjacent said switch means.

7. The apparatus according to claim 6 wherein said means for sealing is formed from a magnetically transparent material and said switch actuation means is formed from a ferrous material.

8. The apparatus according to claim 6 wherein said contact means includes a first contact member connected to and moveable with said biasing means and a second contact member integral with said means for sealing, and said first contact member contacts said second contact member when said magnet means is in said second position to complete an electrical circuit through said switch means representing said first circuit condition.

9. The apparatus according to claim 8 wherein said sealing means includes a cover having an electrically conductive portion defining said second contact member and positioned to contact said second contact member when said magnet means is in said second position.

10. The apparatus according to claim 8 wherein said biasing means is an electrically conductive spring means for transmitting current through said switch means.

11. The apparatus according to claim 8 wherein said first contact member is an electrically conductive sleeve means which carries said magnet means and is connected to said biasing means.

12. The apparatus according to claim 11 wherein said switch means includes guide means for guiding said sleeve means as said magnet means moves between said first and second positions of said magnet means.

13. The apparatus according to claim 1 wherein said rod has a counterweight attached thereto adjacent said opposite end.

14. The apparatus according to claim 13 wherein said counterweight means is unsymmetrical about the longitudinal axis of said rod.

15. The apparatus according to claim 1 wherein said rod is rotatably supported by said housing means about the longitudinal axis of said rod.

16. The apparatus according to claim 1 wherein said housing is provided with stop means engageable with said float means when said rod is in said first position to maintain said rod in said first position when the fluid level is at or above said satisfactory level.

17. The apparatus according to claim 16 wherein the fluid level when said float means is in said first position represents the minimum satisfactory fluid level.

18. The apparatus according to claim 1 wherein said float member is unsymmetrical about the longitudinal axis of said rod.

19. The sensor according to claim 18 wherein said float member has a slot formed in each end thereof, said slots being separated by an internal wall defining an aperture for retaining said one end of said rod.

20. The sensor according to claim 19 wherein said float member includes means for identifying the one of said slots into which said one end of said rod is inserted.

21. The sensor according to claim 1 wherein said rod has a counterweight attached thereto adjacent said opposite end, said counterweight is unsymmetrical about the longitudinal axis of said rod, said rod is supported by said housing means for rotation about the longitudinal axis of said rod, and said float member is unsymmetrical about the longitudinal axis of said rod.

* * * * *